C. A. & R. Williams & G. A. Morse,
Skate.
Nº 21,585.   Patented Sep. 21, 1858.
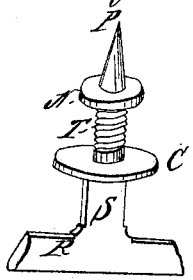
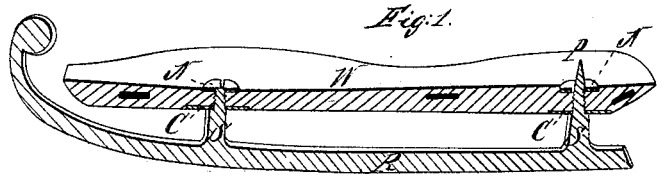
Witnesses:
William Walker
R. L. Mitchell
Inventors:
C. A. Williams
G. A. Morse
Robert Williams

UNITED STATES PATENT OFFICE.

C. A. WILLIAMS, R. WILLIAMS, AND G. A. MORSE, OF BLOOMFIELD, MAINE.

SKATE-IRON.

Specification of Letters Patent No. 21,585, dated September 21, 1858.

*To all whom it may concern:*

Be it known that we, C. A. WILLIAMS, R. WILLIAMS, and G. A. MORSE, of Bloomfield, in the county of Somerset, in the State of Maine, have invented a new and Improved Mode of Attaching Skate-Irons to Their Woods; and we do hereby declare that the following is a full and exact description thereof, reference being had to the accompanying drawings, making a part of this specification, in which—

Figure 1 is a longitudinal section of a skate, and Fig. 2 is a perspective view of a stud with its collar and nut.

In Fig. 1, W, is a longitudinal section of a skate wood.

In Figs. 1, and 2, R, represents a runner or a portion of a runner. S, represents the stud. C, represents the collar. N, represents the nut, and P, the point or heel spur.

In Fig. 2, T, represents a screw thread cut upon the upper portion of the stud.

In constructing our skates, we make them with two or more studs (S,) and the runners (R,) of one solid piece of metal; the studs (S,) pass from the runner (R,) up to the bottom of the wood (W,) where they are furnished with collars or shoulders (C,) thence through the wood (W); the upper part of this portion of the stud has cut upon it a screw-thread (T, Fig. 2.) To this screw the nut (N,) with its female screw is applied so as firmly to clamp the wood (W,) down to the collar (C); thus are the woods made fast to the irons.

The posterior stud is made to pass a convenient distance above the nut (N,) terminates in a point (P,) thus forming a heel-spur, while the other studs, end at the top of the nut (N).

We do not claim that portion of the studs included between the runner and the wood.

We do not claim the collar (C,) nor the nut (N). Nor do we claim any heel-spur which is not a continuation of a stud that is solid to the runner, but

What we claim as our invention and desire to secure by Letters Patent is

That portion of skate-studs (solid to their runners) above the collars (C,) upon which is cut the screw thread (T,) in the manner and for the purposes substantially as set forth in the above description.

C. A. WILLIAMS.
ROBERT WILLIAMS.
G. A. MORSE.

Witnesses:
 WILLIAM WALKER,
 R. L. MITCHELL.